United States Patent [19]

Tanguy

[11] 3,747,990

[45] July 24, 1973

[54] VEHICLE HYDRAULIC BRAKING SYSTEM

[75] Inventor: Christian Tanguy, Soisy Sous Montmorency, France

[73] Assignee: Societe Anonyme D.B.A.

[22] Filed: Dec. 3, 1971

[21] Appl. No.: 204,570

[30] Foreign Application Priority Data

Dec. 15, 1970 France .............................. 7045119

[52] U.S. Cl. ............................ 303/21 AF, 303/21 F
[51] Int. Cl. .............................................. B60t 8/06
[58] Field of Search ....................... 303/21 F, 21 AF

[56] References Cited
UNITED STATES PATENTS
2,812,983  11/1957  Bush .............................. 303/21 AF
3,556,615  1/1971  Stelzer .............................. 303/21 F

*Primary Examiner*—Richard A. Schacher
*Attorney*—Ken C. Decker

[57] ABSTRACT

An anti-skid hydraulic braking system is disclosed which comprises a monitoring device responsive to the angular displacements of the wheels of the vehicle for controlling the fluid pressure level applied to a pressure modulator which in turn controls fluid communication between a standard automotive master-cylinder and the brake motors. The monitoring device is supplied with pressurized fluid from the pump of the general hydraulic system of the vehicle. Upon failure or malfunction of the pump, it is necessary to prevent the monitoring device from terminating fluid communication between the master cylinder and the brake motors which would prevent any further brake application. A control means is provided in the pressure modulator which comprises, in a chamber connected to the outlet of the pump, a reciprocable spring loaded piston which maintains the fluid communication between the mastercylinder and the brake motors when the pressure of said pump falls below a predetermined value.

8 Claims, 1 Drawing Figure

Patented July 24, 1973
3,747,990
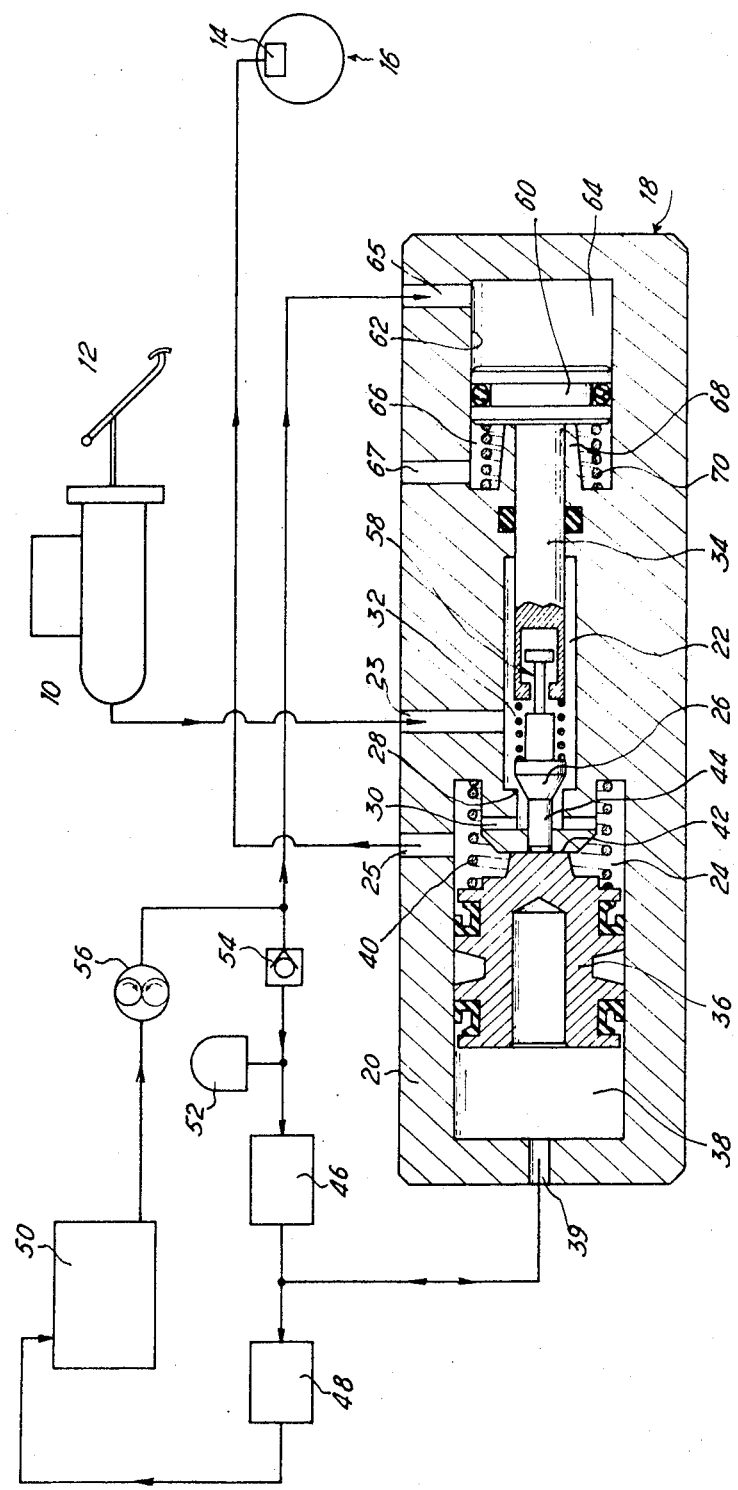

VEHICLE HYDRAULIC BRAKING SYSTEM

BACKGROUND OF THE INVENTION

The invention relates to a vehicle hydraulic braking system and is more particularly concerned with a hydraulic system and comprising pressure modulation means for modulating the braking pressure applied to the brake motors to avoid skidding of the wheels of the vehicle upon application of the brakes.

Hydraulic braking systems are already known which comprise a pressure modulator interposed in an appropriate manner between a hydraulic pressure control source, such as a standard automotive master-cylinder, and a set of brake motors so as to modulate the fluid pressure level applied to these motors as a function of a variable monitoring pressure, established with reference to a pilot pressure source, by monitoring means responsive to the angular displacements of the corresponding braked wheels of the vehicle to prevent slipping of the wheels upon a brake application. The pressure modulator comprises a housing having inlet and outlet chambers communicated with the master-cylinder and the brake motors respectively and a check valve so arranged as to terminate fluid communication from the inlet chamber to the outlet chamber upon actuation by a modulation plunger piston submitted to the monitoring pressure which urges said plunger piston toward a position where it normally maintains said valve in the open position against the force of resilient biasing means.

With such known hydraulic braking systems, any skidding of the wheels of the vehicle causes the monitoring means to reduce the monitoring pressure thereby allowing the plunger piston to move away from said valve. The valve is then urged by its biasing means in engagement with its seat whereby the fluid pressure communicated from the master-cylinder to the brake motors is reduced. However, in case of a malfunction in the hydraulic circuit of the pilot pressure source, the monitoring pressure may fall to a low value. The plunger is then constantly urged away from said valve which latter is thus maintained in its closed position thereby preventing fluid communication between said master-cylinder and said brake motors so that the brakes cannot be applied.

It is therefore desirable to provide an anti-skid braking system avoiding such a drawback.

SUMMARY OF THE INVENTION

Therefore, an important object of my invention is to provide a hydraulic braking system having a pressure modulator which is rendered inoperative upon failure or malfunction of the hydraulic circuit supplying the fluid pressure controlling said modulator.

Another important object of my invention is to provide a pressure modulator for a hydraulic braking system which is simpler and more compact than the known device.

A further important object of my invention is to provide a safer anti-skid hydraulic braking system than the known systems.

DRAWING DESCRIPTION

Other features and advantages of the invention will appear to those skilled in the art from the following description of the sole FIGURE of the drawing which shows a diagrammatic view of a hydraulic system of a vehicle made pursuant to the teachings of my present invention.

DETAILED DESCRIPTION

Referring now to the drawing, a hydraulic braking system of a vehicle comprises a hydraulic pressure source such as a standard automotive master-cylinder generally indicated at 10, operated by a brake pedal 12 so as to supply hydraulic pressurized fluid to a set of hydraulically actuated brake motors such as the brake motor diagrammatically shown at 14. The brake motors 14 are each associated with a wheel 16 of a vehicle (not shown) in manner well known to those skilled in the art. A pressure modulator generally indicated at 18 is interposed between the master-cylinder 10 and the brake motors 14 to modulate, as will be explained herebelow, the hydraulic pressure applied to these latter thereby preventing slipping or skidding of the wheels to which the braking pressure is applied.

The pressure modulator 18 comprises a housing 20 defining therewithin an inlet chamber 22 communicated through an inlet port 23 to the master-cylinder 10 and an outlet chamber 24 cummunicated to the motor brakes 14 through an outlet port 25. A valve located between chambers 22 and 24 includes, in the embodiment illustrated, a movable valve member 26 sealingly engageable with a valve seat 28 to prevent flow of fluid from the inlet chamber 22 to the outlet chamber 24 in a passage 30 interconnecting said chambers. A weak compression spring 32 disposed between said valve member 26 and the free end of a rod 34 sealingly extending through the right end wall of the inlet chamber 22, as viewed in the drawing, normally urges the valve member 26 in engagement with the valve seat 28.

A movable modulation piston assembly 36 is sealingly reciprocable within the outlet chamber 24 and defines with the left end wall of said chamber, as viewed in the drawing, a monitoring compartment 38. A compression spring 40 normally urges the modulation piston 36 toward said end wall of said monitoring compartment 38. When the components of the pressure modulator assume the position illustrated in the FIGURE, the fluid pressure in the monitoring chamber 38 urges piston 36 toward the right end wall of outlet chamber 24 in abutment against a shoulder 42 formed in housing 20; in this position, piston 36 urges valve member 26 in the open condition by way of a plunger or valve stem 44 attached to said valve member 26.

The monitoring fluid pressure applied to an inlet port 39 of compartment 38 is controlled by a pair of conventional electro-valves 46 and 48 disposed in an appropriate manner between a hydraulic reservoir 50 where the fluid pressure is at relatively low level and a hydraulic accumulator 52 loaded through a check valve 54 by a pump 56 fed from reservoir 50 and constituing a pilot pressure source. The electro-valves 46 and 48 are controlled through an electric control unit (not shown) responsive to the angular displacements of the braked wheels. Without going into further details, it should be nevertheless remembered that the monitoring pressure applied to the monitoring compartment 38 is close to the pilot pressure (the latter being itself relatively variable) of the accumulator 52 upon a normal brake application. However, when the braked wheels 16 tend to skid or slip, the monitoring pressure very rapidly decreases to eventually become close to the pressure of the reservoir, if need be.

In the embodiment illustrated, the valve member 26 is connected through a transmission member 58 to the rod 34 which is in turn attached to a piston 60 sealingly slidable within a bore 62 formed in housing 20. The transmission member 58 partially extends into an inner cavity provided in rod 34 where it terminates in a head portion. The cavity is provided at its open end with a shoulder forming flange with abuts against said head when rod 34 is drawn by piston 60 toward the right end of the housing, as viewed in the drawing. The piston 60 divides bore 62 into a pressure chamber 64 having an inlet port 65 communicated with the outlet or high pressure side of pump 56 and a chamber 66 open to the atmosphere through a venting port 67. The relatively high pressure in chamber 64 normally urges piston 60 in abutment with a shoulder 68 of housing 20, against the bias of a compression spring 70 contained in chamber 66, toward the normal operating position of the rod in chamber 22.

MODE OF OPERATION

In operation, the monitoring pressure in compartment 38 is normally substantially equal to the high pressure of the pilot pressure source 50-56 and urges the modulation piston 36 in engagement with shoulder 42, as shown in the drawing. The valve member 26 is in the open position away from its seat 26 thus allowing free flow of fluid between the master-cylinder 10 and the brake motors 14.

Upon actuation of the brake pedal 12, the fluid pressure generated within the master-cylinder is applied through chambers 22 and 24, and passage 30 therebetween, to the brake motors 14. When the braked wheels 16 tend to skid, the electro-valves 46 and 48 are actuated so as to cause the monitoring pressure in compartment 38 to rapidly decrease. Under the conjugated action of spring 40 and of the fluid pressure in chamber 24 on piston 36, said piston 36 is shifted toward the left, as viewed in the drawing. As the piston leaves the position shown in the drawing where it abuts on shoulder 42, valve member 26 is urged in sealing engagement with valve seat 28 by spring 32, thereby preventing fluid communication from chamber 22 to chamber 24. Further movement of piston 36 toward the left, as viewed in the drawing, results in a corresponding increase in the volume of outlet chamber 24; this in turn results in a lowering of the fluid pressure level in said chamber until wheels 16 are again capable of being driven in rotation. Thereafter, the monitoring pressure in compartment 38 and, correspondingly, the braking pressure in chamber 24 will be modulated so as to avoid skidding or slipping of the wheels 16 while ensuring optimum braking force on said wheels.

In the above described hydraulic system, piston 36 is normally urged in abutment against shoulder 42 by a pressure fluid this resulting in the twofold advantage of permitting a simpler and more compact construction of the modulator as compared with the known devices wherein the biasing force exerted on piston 36 is essentially a resilient force. Nevertheless, upon failure of pump 56 or upon a leakage occuring in the fluid circuit supplying compartment 38, piston 36 may be urged toward the left, as viewed in the FIGURE, due to the reduced monitoring pressure. Such a movement results of course in an intimely interruption of fluid communication between the master-cylinder 10 and the brake motors 14.

To avoid this drawback, my invention provides a telescopic arrangement of transmission member 58 and rod 34 which latter is attached to piston 60 slidably mounted in bore 62. The relatively high pressure acting on piston 60 in chamber 64 normally urges piston 60 in abutment on shoulder 68 against the bias of spring 70. It will be easily understood by those skilled in the art, that upon failure of pump 56, the conjugated forces exerted by spring 70 and by the fluid pressure acting on rod 34 in chamber 22 urge piston 60 toward the right, as viewed in the drawing, together with rod 34 and member 58 which latter maintains valve member 26 away from its seat.

I claim :

1. In a hydraulic braking system having brake motor means associated with wheel means;
   a first hydraulic pressure source connectible to said motor means through valve means;
   pressure responsive control means for operating said valve means;
   a second hydraulic pressure source;
   a low pressure reservoir;
   monitoring means responsive to the angular displacements of said wheel means for varying the fluid pressure level applied to said pressure responsive control means by selectively communicating said pressure responsive means to said second hydraulic pressure source and to said low pressure reservoir, whereby said control means actuate said valve means to initiate or terminate fluid communication between said first hydraulic pressure source and said motor means; and
   means for rendering said control means inoperative when the fluid pressure level of said second hydraulic pressure source falls below a predetermined value thereby preventing said control means from terminating fluid communication between said first hydraulic pressure means and said motor means;
   said means for rendering said control means inoperative including a piston means having two opposite sides, a first one of these sides being exposed to the fluid pressure of said second hydraulic pressure source; resilient means engaging said second side of said piston means to shift said piston means from a first or inactive position to a second or active position when the force of said resilient means exceeds the force exerted by said fluid pressure on said one side; and a transmission member for connecting said piston to said valve means.

2. A system according to claim 1 wherein said transmission member includes two telescopically arranged elements, a first one of said elements being attached to said piston means and the second element being attached to said valve means, cooperating abutment means on both elements allowing free reciprocable motion of said second element with respect to said first element when said piston means are in said first position and engaging each other upon motion of said piston means toward said second position, said elements moving thereafter as a whole whereby said second element opens said valve means.

3. In a hydraulic braking system having brake motor means associated with wheel means, and a hydraulic pressure control source connected to said motor means;

a modulator for controlling fluid communication between said hydraulic pressure control source and said motor means, said modulator having a housing comprising an inlet chamber communicated with said control source and an outlet chamber communicated with said motor means; passage means communicating said inlet and outlet chambers; valve means in said passage means for controlling fluid communication from said inlet chamber to said outlet chamber; first resilient means associated with said valve means urging the latter in the closed condition; a modulation chamber; a first piston reciprocable in said modulation chamber and operatively connected to said valve means; an inlet port in said modulation chamber; a pressure chamber; a second piston dividing said pressure chamber into two compartments; a transmission member attached to said second piston operatively connectible to said valve means; second resilient means in one of said compartments urging said second piston in a first position where said transmission member is connected to said valve means and maintains said valve open against the force of said first resilient means; an admission port in said second compartment;

said hydraulic system further comprising a high pressure source and a low pressure source; a monitoring device responsive to the angular displacements of said wheel means and selectively communicating said inlet port with said high pressure source and low pressure source thereby controlling actuation of said valve means by said first piston; said high pressure source being communicated with said admission port of said second compartment to oppose the force of said second resilient means and to urge said second piston in a second position where said transmission member is disconnected from said valve means thereby allowing free actuation of said valve means by said first piston.

4. A system according to claim 3 wherein said valve means comprises a seat and a valve member; said transmission member comprises two telescopically arranged elements, one of said elements being attached to said second piston, the other element being attached to said valve member; cooperating abutment means on both elements located apart from each other when said second piston is in said first position thereby allowing free reciprocable motion of said other element with respect to said one element and abuting each other when said piston is shifted to said second position whereby both elements are moved as a whole to shift the valve member away from its seat.

5. In a hydraulic braking system having brake motor means associated with wheel means;
a hydraulic pressure control source;
a hydraulic circuit communicating said control source to said motors;
a pressure modulator in said circuit for controlling fluid communication between said control source and said motor means as a function of a monitoring pressure;
a monitoring device for establishing said monitoring pressure comprising means responsive to the angular displacements of said wheel means;
a high pressure source and a low pressure source supplying fluid pressures to said monitoring device;
said pressure modulator comprising a housing defining therewithin inlet and outlet chambers communicating with said control source and said motor means respectively;
a passage provided with a check valve communicating said chambers; a modulation piston reciprocable in said outlet chamber defining with the end wall of said outlet chamber; opposed to said passage, a modulation compartment; a port in said modulation compartment connected to said monitoring device to apply said monitoring pressure to said modulation piston; a plunger connected to said piston and extending into said passage; whereby said piston is urged by said monitoring pressure toward a normal position where said plunger urges said valve in the open condition;
said housing further comprising a pressure chamber; a second piston reciprocable in said second chamber; a port in said pressure chamber in communication with said high pressure source; a transmission member connecting said second piston to said check valve, resilient means in said second chamber opposing the force of said high pressure whereby said transmission member urges said valve means in the open condition when the fluid pressure of the high pressure source falls below a predetermined value.

6. A system according to claim 5, wherein said check valve comprises a movable valve member, a valve seat formed in said passage and spring means normally urging said valve member in sealing engagement with said valve seat.

7. A system according to claim 6, wherein said transmission member is a telescopically arranged member exerting a pulling force on said valve member when said second piston is shifted by said resilient means.

8. A system according to claim 5 wherein said second resilient means are provided in said outlet chamber, said second resilient means engaging the side of said modulation piston opposed to the side exposed to the monitoring pressure to urge said piston toward said end wall of said chamber.

* * * * *